May 9, 1933.  M. D. YORK ET AL  1,908,095
STEERING MECHANISM FOR VEHICLES
Filed June 15, 1931    2 Sheets-Sheet 2
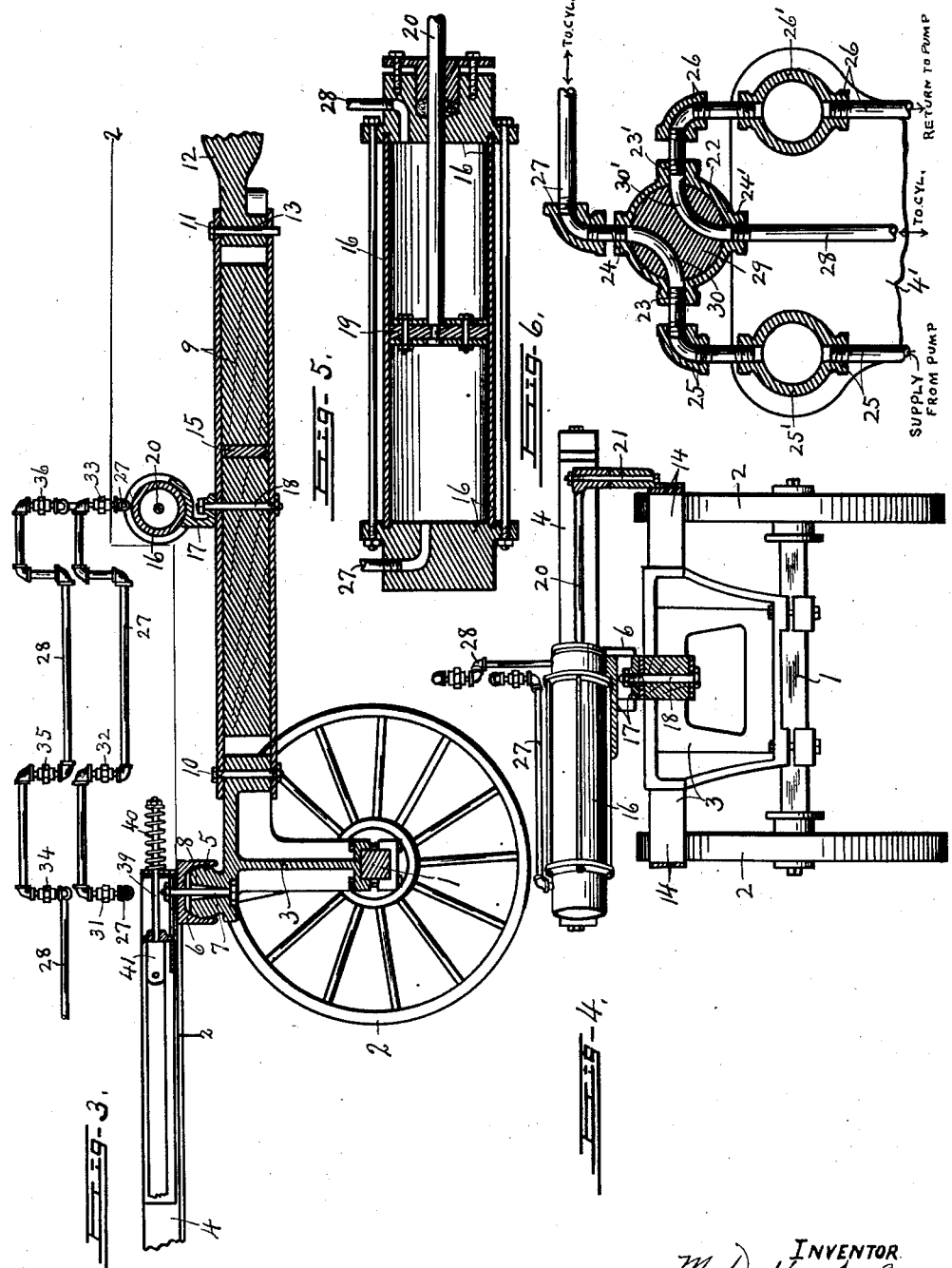
WITNESS
H. L. Meade.
INVENTOR
M. D. York
By P. J. Newton
Denison & Thompson
ATTORNEYS Patented May 9, 1933

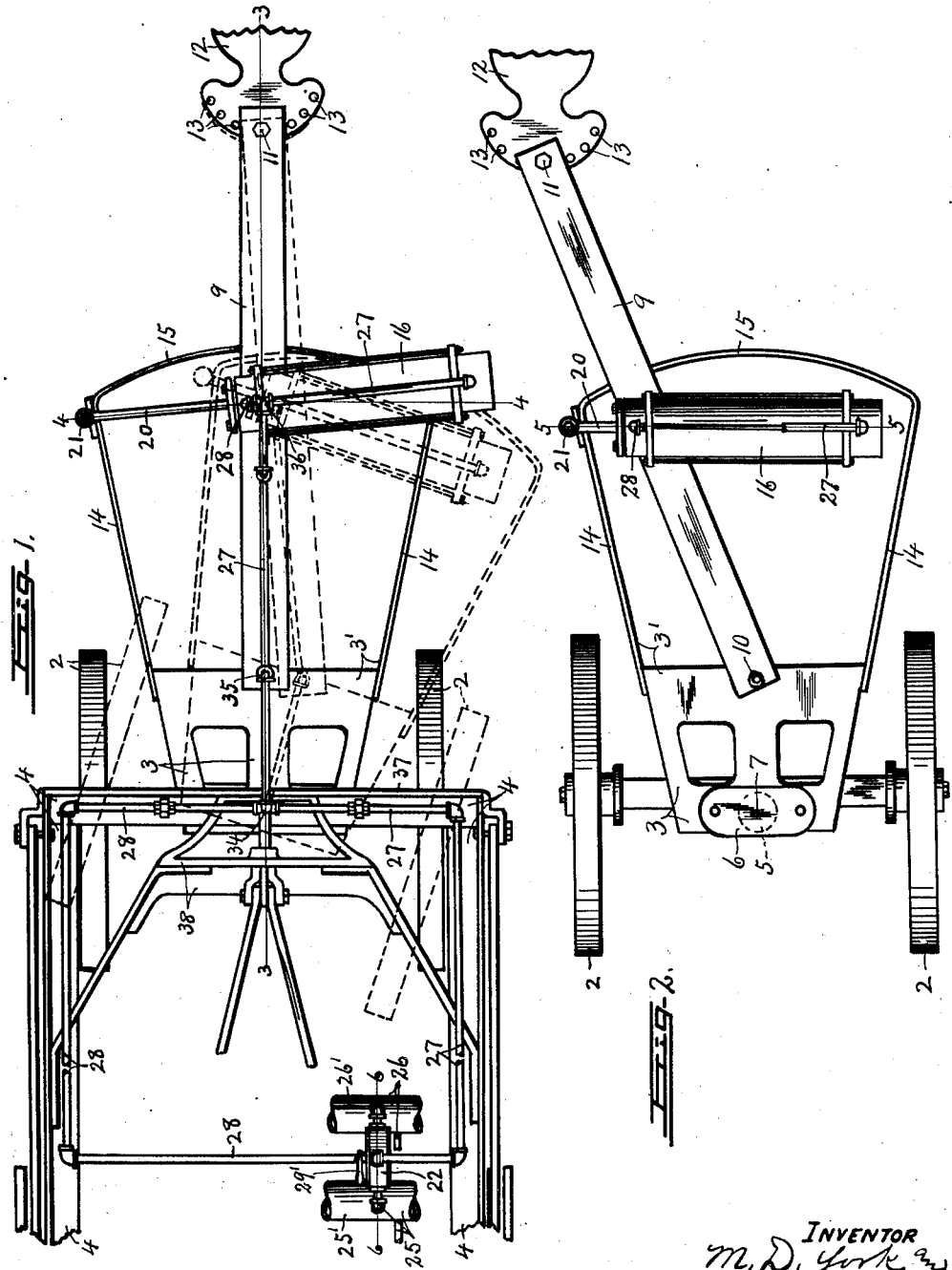

1,908,095

UNITED STATES PATENT OFFICE

MAHLON D. YORK AND PAUL J. NEWTON, OF UNADILLA, NEW YORK

STEERING MECHANISM FOR VEHICLES

Application filed June 15, 1931. Serial No. 544,634.

This invention relates to a power-operated steering device for tractor-drawn vehicles such as road-scarifying and leveling machines of the class set forth in our pending application Serial No. 470,255, filed July 24, 1930.

In the construction, and particularly in widening of public highways, it frequently happens that certain strips of the highway will be relatively solid to afford suitable traction for the wheels of the tractor while other strips to be finished at one or both sides of the solid strip will be more or less soft or otherwise unsuitable for traction purposes, and under these latter conditions it has been found that the usual method of operating the present road-making machines is practically impossible with any reasonable degree of economy and efficiency.

The main object, therefore, of the present invention is to construct and arrange the connections between the tractor and road-machine in such manner that the tractor-drawn machine may be caused to travel in a direct line with, or some distance to one side of, the line of travel of the tractor with equal economy and efficiency.

Another object is to provide power-driven means whereby the road-machine may be shifted laterally to and from the line of travel of the tractor and held in its shifted position so that, when necessary, the road-machine may be used to scarify, scrape or rake the softer or unfinished parts while the tractor is travelling along another or more solid parts of the same highway at one side of the softer parts.

Other objects and uses relating to the specific parts of the invention will be brought out in the following description.

In the drawings:—

Figure 1 is a top plan of portions of a road-grading machine and tractor therefor showing my improved steering connections between those parts in position for direct draft of the machine, the dotted lines indicating the position to which the steering wheels are shifted for offset draft of the machine.

Figure 2 is a top plan of the steering mechanism in which the steering wheels are in offset relation to the line of draft of the tractor, taken in the plane of line 2—2, Figure 3.

Figure 3 is a longitudinal vertical sectional view taken in the plane of line 3—3, Figure 1.

Figure 4 is a transverse vertical sectional view taken in the plane of line 4—4, Figure 1.

Figure 5 is an enlarged longitudinal sectional view through the hydraulic cylinder, taken in the plane of line 5—5, Figure 2, except that a part of the piston rod connection with the steering frame is broken away.

Figure 6 is an enlarged detail sectional view taken in the plane of line 6—6, Figure 1.

In order that the invention may be clearly understood, we have shown a portion of a road-machine comprising a steering axle 1 upon which is loosely mounted a pair of supporting wheels 2, the intermediate portion of said axle being adapted to receive and support an upwardly projecting bolster 3 which is rigidly clamped to the axle in any well known manner and has its upper central portion pivotally connected to a superposed frame 4 through the medium of a ball 5 and socket 6 and a king-bolt 7, as shown more clearly in Figure 1.

The bolster 3 and ball 5 preferably consists of a one-piece steel forging and is provided near its top with a forward extension or hound 3' in a horizontal plane just below that of the ball 5 which is disposed in a vertical plane slightly at the rear of the axle 1.

The socketed member 6 preferably consists of a steel forging bolted or otherwise rigidly secured to the underside of the front end of the frame 4 and provided with a vertical opening registering with a central opening 8 in the ball 5 for receiving the king-bolt 7, the opening 8 being gradually enlarged or flared from the bottom to top to allow limited vertical rocking movement of the bolster and frame about the center of the ball while the bolt serves to hold those parts against vertical displacement.

A draft bar or pole 9 is pivoted at 10 to the central portion of the front end of the extension 3' of the bolster 3 to swing laterally about a vertical axis and to extend forwardly therefrom and has its front end pivotally connected at 11 to a bracket 12 on the rear end of a tractor or other power device, not shown, said bracket being provided with a series of bolt holes 13 arranged transversely of the line of draft for receiving the pivotal bolt 11 and permitting adjustment of the pole to different angles relatively to the normal line of draft or travel of the tractor as may be required to conform to the offset relation of the line of travel of the road-machine to the line of travel of the tractor.

Suitable means, preferably operated by fluid under pressure, is provided for causing the road-machine to travel in line with or in offset relation to the line of travel of the tractor and for this purpose the bolster 3 is provided with forwardly diverging arms 14 arranged equal distances from and at opposite sides of the longitudinal center of the machine and having their front ends connected by a curved cross-bar 15 concentric with the axis of the pivotal bolt 10, as shown more clearly in Figures 1 and 2, to form an extension of the bolster and an outbearing for the draft bar.

A cylinder 16 is secured at one end to a yoke 17 which, in turn, is pivotally connected by a bolt 18 to the intermediate portion of the pole 9 to allow the cylinder and yoke to swing about a vertical axis, said cylinder being arranged transversely of the pole mainly at one side thereof, and provided with a piston 19, Figure 5, having a rod 20 pivotally connected at 21 to the front end of one of the arms 14 near its junction with the curved cross bar 15, as shown in Figures 1, 2 and 4, for turning the front steering truck of the road-machine when fluid under pressure is admitted to the cylinder at either end of the piston in a manner presently described.

That is, the axle 1 and its supporting wheels 2, together with the bolster 3 and its forward extensions 14 and cross-bar 15, constitute what may be termed the steering truck for the road-machine so that when turned about the axis of the king bolt 7 and adjacent ball and socket joint through the action of the piston 19, it will also cause a corresponding lateral rocking movement of the draft bar and cylinder 16 about the axis of their respective pivots 11 and 18, as shown by dotted lines in Figure 1 and by full lines in Figure 2.

The means for circulating and controlling oil or other fluid under pressure to and from the cylinder 16 for operating the piston 19 is somewhat similar to that set forth in our pending application Serial No. 470,255, filed July 24, 1930, in that it includes a valve case 22, Figure 6, having separate pairs of ports 23 and 23' and 24 and 24'.

The ports 23 and 23' are arranged diametrically opposite each other and connected respectively through pipes 25 and 26 to the pressure side and to the suction side of a suitable pump, not shown, while the ports 24 and 24' are connected by pipes 27 and 28 to opposite ends of the cylinder 16, said ports being controlled by a rotary valve 29 adapted to be operated by a handle 29' having separate passages 30 and 30' as shown more clearly in Figure 6.

When the valve 29 is adjusted to one position, as shown in Figure 6, the passage 30 will connect the ports 23 and 24 while the passage 30' will, at the same time, connect the ports 23' and 24', thus causing the liquid under pressure to flow from the pressure side of the pump through the pipe 25, port 23, passage 30 and pipe 27 to one end of the cylinder 16 for moving the piston 19 in one direction resulting in a corresponding turning movement of the steering truck about the axis of the king-bolt 7, as shown by dotted lines in Figure 1.

During this latter operation the liquid in the opposite end of the cylinder will exhaust through the pipe 28, port 24', passage 30' and return through the pipe 26 to the suction side of the pump, thus completing one cycle of operation of the piston and resultant turning of the steering truck in one direction.

Now, if it is desired to turn the steering truck in the opposite direction from its normal direct line of draft it is simply necessary to turn the valve 29 a quarter turn in a counter-clockwise direction, Figure 6, thus causing the passage 30 to connect the ports 23 and 24' and at the same time causing the passage 30' to connect the ports 24 and 23' under which condition the fluid under pressure will flow from the supply pipe 25, through the ports 23 and 24' and pipe 28 to the corresponding end of the cylinder for reversing the previous operation of the piston and steering truck connected thereto, it being understood that the fluid from the cylinder will then exhaust through the pipe 27, ports 24 and 23' and pipe 26 to the suction side of the pump, thus completing another cycle of operation of the piston and resultant turning of the steering truck in the opposite direction from its normal position.

It is now clear that the turning of the steering truck in opposite directions from its straight line or neutral position may be accomplished by simply turning the valve 29 from a neutral position closing all of the ports to either of the open positions just described, and that the turning angle of the steering gear may be regulated by simply adjusting the valve to its neutral or closed position when the proper angle is reached or when the steering gear is brought into direct line with the center line of travel of the tractor, the term tractor being used in its broadest sense to define any means for drawing the road-machine.

It will also be evident from the foregoing description that when the steering gear is turned to any angle from its neutral position it will cause the road-machine to travel in corresponding offset parallel relation to the center line of travel of the tractor and that this offset relation may be sufficient to allow the tractor to travel on solid pavement while the road-machine may travel on more or less loose soil wholly at one side of the pavement, thereby greatly reducing the difficulties and cost of road-grading in general.

The supply pipe 27 is provided with turning joints 31, 32 and 33 arranged respectively in vertical alignment with the underlying pivotal bolts 7, 10 and 18 to permit said pipe to flex laterally at the joints when the steering truck 3, draft bar 9 and cylinder 16 are turned about their respective pivots.

In like manner the pipe connection 28 between the pump and cylinder is provided with turning joints 34, 35 and 36 in vertical alignment with the pivotal bolts 7, 10 and 18 respectively to permit flexing of the joints as the truck, draft bar and cylinder are turned about their respective pivotal bolts. thereby avoiding overstraining of any of the pipe connections.

In Figures 1 and 6 we have shown portions of the pipe connections 25 and 26 as consisting of headers 25′ and 26′ similar to those shown in our pending application previously referred to, so that the valve case 22 and its valve 29 of the present application may be used in connection with the same headers.

The front ends of the side bars of the frame 4 are connected by a cross bar 37 and by a forwardly tapered brace frame 38, the central portions of said cross bar and brace frame being provided with aligned apertures for receiving a sliding bolt 39 having its forward end yieldingly connected to the front cross bar by means of a coil spring 40 and its rear end attached to a yoke 41.

A pair of draft bars 42 are pivotally connected at their forward ends to the yoke 41 and are adapted to be connected at their rear ends to a scraper, scarifier, rake or other road-finishing devices of the character set forth in my pending application, previously referred to, and not shown in the present application for the reason that the instant application is not directed to any particular road-finishing implement.

*Operation*

When it is desired to draw the road machine in the direct line of travel of the tractor, the valve 29 will be adjusted to a neutral position to close all of the ports 23 and 24 and 23′ and 24′. On the other hand, if it is desired to cause the road machine to travel in offset relation as, for example, to the right of the line of draft of the tractor, the valve 29 will be adjusted to the position shown in Figure 6, thereby allowing the fluid under pressure to flow from the source of supply through the pipe 25, passage 30 and pipe 27, to the lefthand end of the cylinder, Figure 1, thereby forcing the piston 19 toward the righthand end of the cylinder and allowing the fluid to exhaust from the righthand end of the cylinder through the pipe 28 and passage 30′ and return through the pipe 26 to the source of supply, it being understood that the valve 29 will be closed as soon as the steering truck is shifted laterally to the desired offset.

If, however, it is desired to cause the road-machine to travel in offset relation to the lefthand side of the line of draft of the tractor, the valve 29 will be turned to cause the passage 30 to connect the ports 23 and 24′, at which time the passage 30′ will connect the ports 24 and 23′, thus permitting the fluid under pressure to pass from the pipe 25 through the ports 23 and 24′ and thence through the pipe 28 to the righthand end of the cylinder, allowing the liquid in the lefthand end of the cylinder to exhaust through the pipe 27 and ports 24 and 23′ and return through the pipe 26 to the source of supply, the valve being closed as soon as the road machine is offset to the desired degree from the line of draft.

What we claim is:—

1. The combination with a vehicle having a frame and a wheel truck pivoted thereto to turn about a vertical axis for steering purposes, a pole pivoted to the truck in front of the pivotal connection between the frame and truck to permit relative lateral swinging movement of the pole and truck and provided with means for attachment to a draft device, a motor mounted on the pole and operatively connected to the truck for turning said truck laterally about its pivotal connections with the frame and pole, and means for operating the motor.

2. In a steering mechanism for vehicles, a two wheel truck having an axle and a bolster rigidly secured to said axle, pivotal connections between the bolster and frame of the vehicle for permitting relative lateral turning movement of the truck and frame for steering purposes, a pole pivoted to the bolster for lateral swinging movement, a draft device pivoted to the pole to swing laterally, a motor mounted on the pole and operatively connected to the bolster for turning the truck laterally relatively to the frame and pole.

3. A steering mechanism for vehicles as in claim 1 in which the pivotal connections between the truck and frame and between the pole and truck are located respectively at the rear and in front of the vertical plane of the axis of the wheels.

4. A steering mechanism for vehicles as in claim 1 in which the pivotal connections between the truck and frame and between the pole and truck are disposed in the same vertical plane substantially midway between the wheels.

In witness whereof we have hereunto set our hands this 2nd day of June, 1931.

MAHLON D. YORK.
PAUL J. NEWTON.